June 23, 1964

E. ELLNER 3,138,727

ELECTRIC MOTOR

Filed Nov. 29, 1961

INVENTOR.
EDWIN ELLNER

BY *Mandeville & Schweitzer*

ATTORNEYS

June 23, 1964    E. ELLNER    3,138,727
ELECTRIC MOTOR
Filed Nov. 29, 1961    2 Sheets-Sheet 2
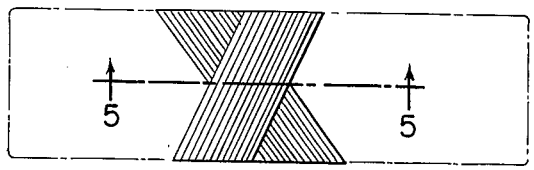
FIG. 3
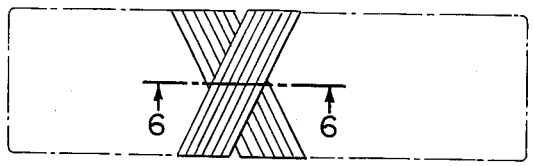
FIG. 4
FIG. 5    FIG. 6
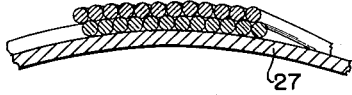    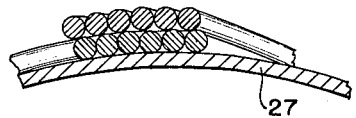
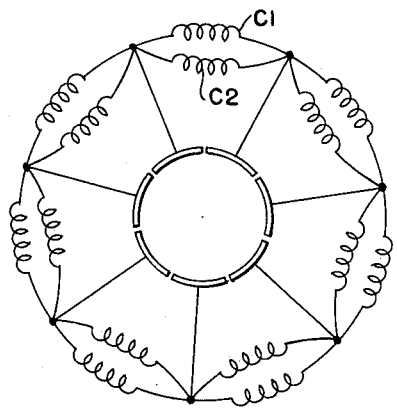
FIG. 7
INVENTOR.
EDWIN ELLNER
BY
Mandeville & Schweitzer
ATTORNEYS

United States Patent Office 3,138,727
Patented June 23, 1964

3,138,727
ELECTRIC MOTOR
Edwin Ellner, Oxford, Conn., assignor to Consolidated Electronics Industries Corp., Waterbury, Conn., a corporation of Delaware
Filed Nov. 29, 1961, Ser. No. 155,729
1 Claim. (Cl. 310—40)

The present invention relates to electric motors, and is directed more particularly to improvements in electric motors of the general type described and claimed in United States Patent No. 2,513,410, issued July 4, 1950, to Arthur William Haydon.

The electric motor described in and covered by the above-mentioned United States Patent No. 2,513,410 incorporates, as one significant aspect of its construction, a wound rotor including conductive windings wound upon a thin, shell-like core of non-magnetizable material. The core, or rotor shell, forms a rotating enclosure which surrounds and embraces a stationary stator element of magnetizable material. In addition, the wound rotor shell is surrounded by a cylindrical casing, forming part of the motor housing. The casing is formed of magnetizable material and is associated with the stationary, magnetizable stator core in such a way as to provide an effective magnetic circuit, broken only by the annular air space or air gap in which the wound rotor shell revolves. The patented motor construction has been found to be particularly desirable and advantageous for many purposes, since the commutation of the wound rotor is such as to avoid reversal of magnetism in any portion of the magnetizable material of the stationary stator and the cylindrical casing material.

In the design and construction of motors of the general type covered by the before-mentioned United States Patent No. 2,513,410, a significant consideration is the provision of a minimum air gap between the stationary, internal stator core and the surrounding, cylindrical casing. By providing a minimum air gap, the need for using magnetizable material in the rotating rotor shell can be avoided and substantial advantages may be realized. In the past, this factor has placed certain design limitations upon the patented motor construction, relating to the efficient current-carrying capacity of the motor. Thus, in the contemplated form of the patented motor, the thin rotor shell includes a generally cylindrical outer wall portion arranged to rotate within the cylindrical air gap of the magnetic circuit and serving as a support for two, generally cylindrical layers of wire forming the rotor windings. The windings are arranged in spiral progression, with the windings of one layer extending diagonally in one direction across the cylindrical wall of the rotor shell, and the windings of the second layer extending diagonally in the other direction, directly on top of the first layer of windings.

In the past, in order to increase the current-carrying capacity of the subject motors, it has been conventional to increase the size of the wire conductors used in the windings. However, as the wire diameter is increased, the point soon is reached at which the annular air gap must be increased, necessitating special design changes and introducing electrical or magnetic inefficiencies.

In accordance with the present invention, specific improvements are made in motors of the general type described and claimed in United States Patent No. 2,513,410, enabling substantial increases in current-carrying capacity to be realized without redesign of the standard motor components and without introducing undesired inefficiencies. More specifically, the improvement of the present invention involves the formation, in a motor of the general design under consideration, of special rotor windings, in which the "conductors" of the winding are formed by two wires disposed physically in side-by-side relation, or at least in the same circumferential layer, connected at the ends in parallel electrical relation, and aggregating in total conductor area for the two wires the total desired conductor area normally provided by a single wire. The improved arrangement enables the two parallel conductors of a complete coil to be laid in a single circumferential layer on the outer wall of the rotor shell, so that the radial air space occupied by the conductors is only about 70% of that required for a conventional winding of equivalent current-carrying capacity.

The improved design features impart significant flexibility to the design and construction of motors of the general type covered by the before-mentioned A. W. Haydon patent, since wide variation in current-carrying capacity may be accommodated without change of the standard mechanical components of the motor. In addition, the improvements of the invention enable motors of substantially increased current-carrying capacity to be constructed without excessive loss of efficiency through undue enlargement of the annular air gap in which the rotor windings travel.

For a better understanding of the above and advantageous features of the invention, reference should be made to the following detailed description and to the accompanying drawings, in which, FIG. 1 is a longitudinal cross sectional view of an electric motor incorporating the improved construction features of the invention;

FIG. 3 is a simplified, schematic representation of a rotor winding made in accordance with the invention;

FIG. 4 is a simplified, schematic representation of a typical rotor winding, equivalent to that shown in FIG. 3 in electrical current-carrying capacity, but constructed in accordance with the known design principles;

FIGS. 5 and 6 are enlarged, fragmentary cross-sectional views taken generally on lines 5—5 and 6—6 of FIGS. 3 and 4, respectively; and FIG. 7 is a simplified, schematic representation of the electrical circuit arrangement of the improved motor of the invention.

Figure 1:
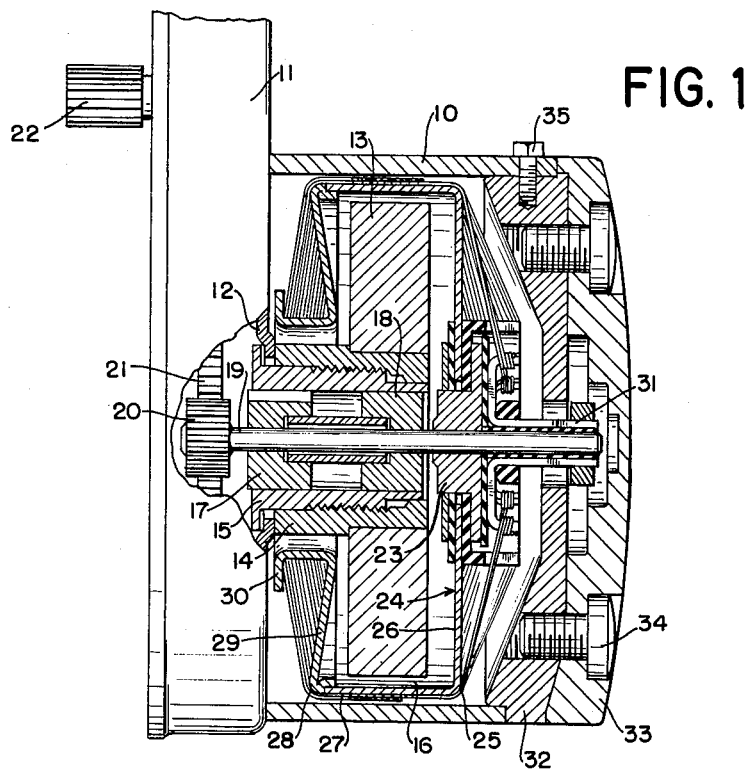

Referring now to the drawings, and initially to FIG. 1, the reference numeral 10 designates a cylindrical casing, forming the outer part of a motor housing. A gear box housing 11 is secured to one end of the cylindrical casing 10, and one wall 12 of the gear housing forms the forward wall of the motor housing. The cylindrical casing 10 and the forward wall 12 are formed of magnetizable material, for purposes to be described further.

With respect to its basic components, the motor of FIG. 1 advantageously is constructed substantially in accordance with the teachings of the previously mentioned Haydon Patent No. 2,513,410 and, in this respect, the motor incorporates a stationary core member 13 of magnetizable material, which is of disc-like configuration and is mounted at its center by a tubular bushing 14. The bushing 14 is threaded internally to receive a flanged clamping bushing 15, such that the stationary magnetizable element 13 is fixed in position within the motor housing by the clamping action of the threadedly engaged bushings 14, 15 on the front wall 12 of the housing. The bushings 14, 15 are formed of magnetizable material and serve to complete a magnetic circuit comprising the cylindrical casing 10, the front housing wall 12, the bushings 14, 15 and the stationary magnetizable core 13. The thus described magnetic circuit is complete except for a predetermined annular air gap 16 formed between the stationary magnetizable core and the inner surface of the cylindrical casing 10.

Received within the tubular bushing 15 are bearings 17, 18 which journal a rotor shaft 19 carrying a drive pinion 20 at its outer end. Typically, the drive pinion 20 meshes with other gears 21 of a gear reduction train having an ultimate output drive pinion 22 projecting from the gear box housing 11.

Fixed to the motor shaft 19 is a flanged collar 23 which supports, in insulated relation, a hollow rotor 24, advantageously constructed of non-magnetizable material and of a shape and size substantially to surround and embrace the stationary magnetizable core 13. To accommodate assembly, the rotor 24, which can be referred to descriptively as a rotor shell, comprises a back part 25 forming a radial wall 26 and a generally cylindrical outer wall 27, and a front part 28 forming a front wall 29 and an annularly grooved hub 30. As illustrated in FIG. 1, the cylindrical outer wall of the rotor shell is disposed between the motor casing 10 and the stationary magnetizable core 13 and is arranged for rotation within the air gap defined by the last-mentioned members.

In accordance with principles discussed more fully in the aforementioned Patent No. 2,513,410, the rotor shaft 20 mounts, in insulated relation, a commutator structure comprising a plurality of commutator segments 31. In the illustrated motor, which is representative only, there are seven such commutator segments, arranged to accommodate seven pairs of coils for the rotor, as will be described in more detail.

Typically, the back part of the motor housing is enclosed by cap members 32, 33, formed of insulating material. The outer cap 33 is secured to the inner cap by one or more screws 34, and the entire assembly is secured to the cylindrical motor casing 10 by means of a screw 35. As described fully in the aforementioned Patent No. 2,513,410, the insulated cap assembly includes appropriate brushes arranged for operative engagement with the commutator segments 31. The construction and arrangement of such brushes forms no part of the present invention, and a specific description thereof is omitted from this description. Accordingly, the reader is referred to the beforementioned Haydon patent for full details of appropriate brush arrangements.

Figure 2:
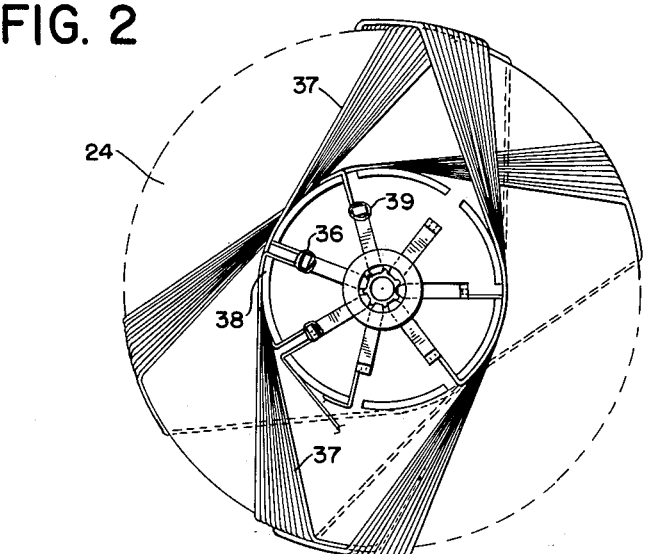
FIG. 2 is an end elevational view of a wound rotor, incorporated in the motor of FIG. 1 and constructed in accordance with the invention.

As shown in FIG. 2, the non-magnetizable rotor shell 24 serves as a support for a plurality of sets of rotor coils wound in an advantageous manner, to provide two layers of coil elements extending across the cylindrical outer wall of the rotor shell for operative relationship in the magnetic circuit including the magnetizable core 13 and the motor casing 10. A typical winding may commence at, for example, a terminal 36 (FIG. 2) of the commutator, and the conductor element 37, which forms part of the winding, extends outward to the periphery of a hub 38 and thence generally tangentially of the hub toward the periphery of the rotor shell 24. At the outer edge of the rotor shell, the coil conductor is directed diagonally in one direction (e.g. to the right) across the face of the outer wall of the rotor shell. The conductor is then extended across the back of the rotor shell, generally diametrically, but diverted into the annularly grooved hub 30 of the rotor shell. The conductor 37 is then returned diagonally to the left across the bottom portion of the outer wall of the rotor shell, and thence back, in generally tangential relation to the hub 38 toward the point from which the conductor emanated.

In a typical motor construction, an individual coil consists of a plurality of successive windings, arranged in more or less spiral progression, so that the conductors lie side by side in one circumferential layer on the outer surface of the rotor shell. After a predetermined, desired number of turns of a single coil, the opposite end of that coil is connected to the next successive commutator terminal such as the terminal 39.

In a complete motor of typical design, there will be provided seven coils wound in one direction (e.g. in a clockwise direction from the starting terminal) and seven more coils wound in the opposite direction (e.g. counterclockwise from the starting terminal). The second set of coils is symmetrically related to the first set, and the diagonally extending coil elements passing across the cylindrical outer wall of the rotor shell substantially directly overlie and cross over the corresponding, diagonally disposed coil elements of the first set so that, in the completely wound rotor, there are two circumferentially extending layers of coil elements extending across the outer wall of the rotor shell.

In accordance with the specific improvement of the invention, the individual sets of coils are especially composed so that substantially increased current-carrying capacity is realized without necessitating an increase in the radial thickness of the overlapped layers of coil elements traversing the outer edge of the rotor shell. Thus, as explained in more detail in the aforementioned A. W. Haydon patent, the efficiency of the described motor assembly is a significant function of the air gap between the stationary, magnetizable core 13 and the cylindrical casing 10. This is particularly so since the material of the rotor shell is not magnetizable. However, in accordance with conventional procedures, increasing the current-carrying capacity of the motor by simply enlarging the size of the conductors not only would involve costly redesign of standard motor components, but also would produce undesirable inefficiencies resulting from increasing the thickness of the annular air gap 16. However, in accordance with the invention, significant increases in current-carrying capacity can be realized without any structural change whatever in the standard motor construction and without increasing the air gap. To this end, coil conductor elements of increasing current-carrying capacity are comprised of two separate conductor elements arranged physically in the same circumferential layer, insulated from each other but connected in electrical parallel at their opposite terminals.

More specifically, whereas in the standard motor construction, each turn of a coil is formed of a single conductor, each turn of a coil in the improved motor of the invention is formed by two parallel conductors, whose aggregate conducting area is equal to an area preselected to provide the desired current-carrying capacity in the coil elements. As indicated in FIG. 2, pairs of conductor elements comprising each turn of a coil are arranged in side-by-side relation and are disposed circumferentially in passing over the cylindrical outer wall of the rotor, so that the total thickness of the coil layer is equal to that of a single, small-size conductor element.

In the improved motor of the invention, coil thickness in the region of the air gap is approximately 70% of the thickness of a conventionally wound coil of equivalent current-carrying capacity. The new coil forming technique does, of course, result in distribution of the coil elements over a 40% greater circumferential area of the rotor wall. However, this is not detrimental in any way, since, in motors contemplated by this invention, circumferential areas of the rotor shell are unused and available to receive the additional conductor elements.

Within the contemplation of the invention, it is also possible, and perhaps even more practical in certain cases, to form each coil of the rotor as two parallel connected half-coil sections, rather than to wind the individual, parallel connected conductors in physical side-by-side relation. In the latter case, the two half-coil sections are wound sequentially and would lie in the same circumferential layer, so that the total thickness of the parallel wound half-coil sections would be the thickness of one conductor element. As will be understood, the mechanical and electrical principles involved in either of the described arrangements are substantially identical, although different techniques of coil winding are involved.

In FIG. 7, there is schematically represented an electrical wiring diagram of the improved motor, it being understood, however, that the schematic diagram reflects only one set (e.g., clockwise-wound) of rotor coils.

Thus, each coil, in electrical effect, consists of two half-coil sections $C_1$ and $C_2$ connected at their terminals to appropriate commutator segments of the rotor. As previously explained, the half-coil sections $C_1$, $C_2$ may consist of two conductors wound side by side in a manner such that the individual turns of the half-coil sections are intermingled, or the half-coil sections may be wound successively to lie side by side, with their active elements in the same circumferential layer on the outer wall of the rotor shell.

In FIGS. 3-6, the improved motor winding arrangement is shown in comparison to a winding of corresponding curent-carrying capacity made in accordance with conventional practices. Thus, in FIG. 6, the winding is shown to be formed of a predetermined number of turns of a conductor having a diameter $D_1$ of predetermined size for the desired current-carrying capacity. The total thickness of the conventional coil, illustrated in FIG. 6, is equal to twice the predetermined diameter $D_1$. In contrast, in the improved motor construction illustrated in FIG. 5, the coil is comprised of twice as many effective conductor elements having a diameter $D_2$ equal to 0.707 (approximately 70%) of the diameter $D_1$ of the conductors of the conventional motor. Thus, the critical radial thickness of the coils of the improved motor of FIG. 5 is only about 70% of the thickness of the conventional coil of FIG. 6, and the total desired conductor area is realized by correspondingly increasing the non-critical circumferential dimension of the coil. The last-mentioned feature is illustrated representatively in FIGS. 3 and 4, FIG. 3 being representative of the improved winding of the invention, which is shown to be approximately 40% larger in circumferential dimension than the conventional coil of FIG. 4.

The improved motor construction of the invention is of significant advantage with respect to extending substantially the range of current-carrying capacities of motor assemblies otherwise utilizing standard structural components. That is, motors of present design, incorporating principles of the A. W. Haydon Patent No. 2,513,410, can be given significantly increased current-carrying capacity without significant design change, except for the incorporation of the improved winding arrangement of the invention. Additionally, even in cases where it may prove desirable or necessary to increase the width of the air gap 16, in order to accommodate larger conductors and provide further current-carrying capacity, the motor of the present invention will require substantially less increase in the air gap than a motor of conventional construction, for the same current-carrying capacity, so that improved operating efficiency would be realized in the new motor.

It should be understood that the specific form of the invention herein illustrated and described is intended to be representative only, as certain designed changes may be made without departing from the clear teachings of the invention. Accordingly, reference should be made to the following appended claim in determining the full scope of the invention.

I claim:
An electric motor assembly comprising,
(a) a fixed internal core of magnetizable material,
(b) a hollow rotor shell formed of thin non-magnetizable material and generally surrounding and embracing said fixed magentizable core,
(c) said rotor shell being mounted for rotation about said magnetizable core and having a thin, substantially uninterrupted cylindrical outer wall forming a small uniform annular air gap around said core,
(d) a motor housing formed at least in part of magnetizable material and including a cylindrical outer casing of magnetizable material,
(e) said cylindrical casing closely surrounding the cylindrical outer wall of said rotor shell and forming therewith a narrow annular air gap,
(f) a first set of spirally progressing series-wound coil turns comprising a predetermined plurality of coil elements extending diagonally in one direction across the cylindrical wall of said rotor shell and disposed in side-by-side relation circumferentially about said uninterrupted cylindrical wall in a single generally cylindrical layer,
(g) a second set of spirally progressing series-wound coil turns comprising a predetermined plurality of coil elements extending diagonally in the other direction across the cylindrical wall of said rotor shell and disposed circumferentially about said cylindrical uninterrupted wall in a single generally cylindrical layer supported directly by said first layer of coil elements,
(h) the coil elements of said second set of coils overlying and crossing diagonally over the coil elements of the first set of coils,
(i) each coil comprising a plurality of wires connected in parallel and having their diagonally extending coil elements physically disposed in the same generally cylindrical circumferential layer on the cylindrical outer wall of said rotor shell,
(j) the annular air gap between the cylindrical wall of said rotor shell and said cylindrical casing being not substantially greater than the combined two-layer thickness of said overlapped and crossed coil elements, and
(k) a plurality of commutator elements mounted on said rotor shell,
(l) the predetermined plurality of conductors of each of said coils being electrically connected at one end to a common first commutator segment and at the opposite end to a common second commutator element.

References Cited in the file of this patent
UNITED STATES PATENTS 2,513,410    Haydon ---------------- July 4, 1950
2,743,386    Diehl ----------------- Apr. 24, 1956

OTHER REFERENCES

Publication entitled, "Ankerwicklugen und Ankerkonstruktionen" der Gleichstrom-Dynamo Maschinen, by E. Arnold, 1899, copy in Div. 26.